(12) United States Patent
Mishra et al.

(10) Patent No.: US 8,116,397 B2
(45) Date of Patent: Feb. 14, 2012

(54) SYSTEM AND METHOD FOR SYMBOL BOUNDARY DETECTION IN ORTHOGONAL FREQUENCY DIVISON MULTIPLEXING BASED DATA COMMUNICATION

(75) Inventors: Mridul Manohar Mishra, Noida (IN); Armit P. Singh, Ludhiana (IN); Anshoo Tandon, Bangalore (IN)

(73) Assignee: Freescale Semiconductor, Inc., Austin, TX (US)

( * ) Notice: Subject to any disclaimer, the term of this patent is extended or adjusted under 35 U.S.C. 154(b) by 281 days.

(21) Appl. No.: 12/581,899

(22) Filed: Oct. 20, 2009

(65) Prior Publication Data

US 2011/0090973 A1    Apr. 21, 2011

(51) Int. Cl.
*H04K 1/10* (2006.01)
*H04J 11/00* (2006.01)
(52) U.S. Cl. ........................................ 375/260; 370/208
(58) Field of Classification Search .................. 375/142, 375/145, 147, 149, 150, 260, 262, 265, 267, 375/343, 354; 370/208, 350; 708/422, 426
See application file for complete search history.

(56) References Cited

U.S. PATENT DOCUMENTS 7,203,245 B1 * 4/2007 Murphy ........................ 375/260
7,391,828 B2    6/2008 Liu et al.
2004/0170237 A1 * 9/2004 Chadha et al. ................. 375/343
2004/0223554 A1 * 11/2004 Cha ............................... 375/260
2007/0189263 A1 * 8/2007 Izumi et al. .................... 370/350
2009/0323591 A1 * 12/2009 Takahashi et al. ............ 370/328

OTHER PUBLICATIONS

Wang Dong, Zhang Jinyun, "Timing Synchronization for MIMO-OFDM WLAN Systems", 2007 IEEE.
S.K. Manusani et al. "Robust Time and Frequency Synchronization in OFDM based 802.11a WLAN systems", 2006 IEEE.
"A symbol boundary detection scheme with low complexity and high PER at low SNR operating point for an OFDM system", www.ip.com, IPCOM000158873D, Oct. 3, 2007.

* cited by examiner

*Primary Examiner* — Young T. Tse
(74) *Attorney, Agent, or Firm* — Charles Bergere

(57) ABSTRACT

A method for determining a symbol boundary of a data packet of a received signal, where the data packet includes a first training field, a guard interval, and a second training field. The received signal is sampled to obtain multiple samples. A first symbol boundary estimate is determined using one or more block auto-correlation values. Thereafter, a second symbol boundary estimate is determined based on the first symbol boundary estimate and using one or more cross-correlation values. The second symbol boundary estimate then is shifted using moving average auto-correlation values for the samples in the vicinity of the second symbol boundary estimate to obtain an accurate symbol boundary estimate.

19 Claims, 7 Drawing Sheets

SYSTEM AND METHOD FOR SYMBOL BOUNDARY DETECTION IN ORTHOGONAL FREQUENCY DIVISON MULTIPLEXING BASED DATA COMMUNICATION

BACKGROUND OF THE INVENTION

The present invention relates generally to Orthogonal Frequency Division Multiplexing (OFDM) based data communication, and, more specifically, to a method and system for determining a symbol boundary in a Multiple-Input-Multiple-Output (MIMO) OFDM data communication system.

OFDM uses a digital multi-carrier scheme that has one or more orthogonal sub-carriers. Orthogonality of the sub-carriers is achieved by spacing the sub-carriers with a minimum frequency and thus, preventing them from interfering with each other. Each sub-carrier communicates data in the form a stream of data packets. Further, each sub-carrier is modulated using a conventional modulation technique (e.g., quadrature amplitude modulation or phase shift keying) at a low symbol rate. The use of a low symbol rate leads to improved tolerance to multipath delay. Due to the use of multiple sub-carriers, the total data rate is equivalent to conventional single-carrier modulation techniques.

The increased tolerance to multipath delays without any impact on the total data rate has increased the popularity of OFDM communication systems. OFDM can be used for both wired and wireless data communication. In wireless communication systems, it has been incorporated in various IEEE standards such as 802.11, 802.16.

In accordance with standards such as IEEE 802.11a for Wireless Local Area Network (WLAN) system, an OFDM data packet has a standard field structure. The field structure of a typical OFDM burst packet will be explained below in conjunction with FIGS. 1A and 1B.

FIGS. 1A and 1B illustrate a data packet 100 in accordance with IEEE 801.11a WLAN standard. Referring to FIG. 1A, the data packet 100 includes a short training field (STF) 102, a long training field (LTF) 104, a signal (SIG) field 106, and a rest of packet (ROP) field 108. FIG. 1B depicts detailed views of the STF 102 and the LTF 104.

The STF 102 includes a set of ten (10) identical short preambles S1, S2, etc., each having a duration of 0.8 μs and in which each short preamble includes 16 samples. Thus, the STF 102 includes 160 samples. The STF 102 is followed by the LTF 104. The LTF 104 includes a guard interval (GI2) and two identical long preambles LP1 and LP2. The time duration of GI2 is 1.6 μs and includes 32 samples. The GI2 is followed by the two identical long preambles LP1 and LP2, each having time duration of 3.2 μs, and each long preamble includes 64 samples. The 32 samples of GI2 are a copy of the last 32 samples of LP1 or LP2. The LTF 104 is followed by the SIG field 106, which includes 160 samples representing information relating to the ROP field 108. The ROP field 108 includes data represented as symbols in which each symbol includes 64 samples. Further, each symbol is preceded by a guard interval of 16 samples that are a copy of the last 16 samples of the corresponding symbol. This technique helps to reduce Inter Symbol Interference (ISI). For extracting data from the data packet 100, the correct boundary of OFDM symbols must be known. The detection of the boundary is known as Symbol Boundary Detection (SBD). The symbol boundary is found using the known information of the STF and the LTF of the received packet. Traditionally, two methodologies have been used to find the symbol boundary. The first method finds the boundary between S10 and GI2 (STF-GI2), and the second one finds the boundary between GI2 and LP1 (GI2-LTF), as in FIG. 1B.

Existing OFDM systems use various synchronization schemes such as auto-correlation and cross-correlation to perform SBD. The auto-correlation scheme entails calculation of auto-correlation values for the samples obtained subsequent to sampling of a received signal with previously obtained samples of the received signals. The auto correlation scheme exploits the periodic nature of the symbols in the STF, where a sample belonging to one preamble is repeated at the corresponding sample position in the subsequently received preambles. The auto-correlation values rise as the receiver starts receiving the short preambles. Thereafter, the auto-correlation values become stable for a time duration during which the STF is received, thereby forming a plateau. A fall in the auto-correlation values marks the end of the STF and the beginning of the GI2. The sample corresponding to the fall in the auto-correlation values is recorded and used as an estimate for the STF-GI2 boundary. However, due to high noise and low Signal to Noise Ratios (SNRs), the sampling instant corresponding to the above-mentioned fall may be recorded at a position that is offset from a correct boundary due to the poor correlation metric of short preambles at low SNR. Thus, the timing variance of the auto-correlation synchronization scheme is large and may degrade performance of the OFDM system. Accordingly, such auto-correlation synchronization schemes are used to achieve only a coarse estimate of the STF-GI2 boundary.

To overcome this shortcoming of the auto-correlation synchronization scheme, cross-correlation synchronization may be used. Cross-correlation entails calculation of cross-correlation values of known LTF samples with the samples in the vicinity of the GI2-LTF boundary that was estimated based on the coarse STF-GI2 boundary estimate. The peak of the cross-correlation output is detected to determine an estimate of the GI2-LTF boundary. Such a cross-correlation scheme is used to achieve a fine boundary estimate because it has a better correlation metric as well as a sharp gradient. Although, the combination of auto-correlation and cross-correlation provides improved signal boundary estimates as compared to the method using only auto-correlation, the combination performs poorly at low SNR. The poor performance may be attributed to the poor cross-correlation metric of the LTF and poor auto-correlation metric of the STF. As a result considerable errors may be introduced in the SBD process.

In order to overcome these shortcomings, inverted half auto-correlation is used for fine-boundary estimation instead of cross-correlation. The fine-boundary estimation is followed by processing of the fine-boundary estimate in a correction module. The correction module entails calculation of a predetermined number, such as three, of auto-correlation values (ACVs) corresponding to a second set of samples obtained subsequent to the fine-symbol boundary estimate. Each of the ACVs is obtained corresponding to a set of 64 samples, which are separated by 32 samples. These ACVs are subsequently compared with a maximum ACV value that is obtained during the coarse boundary estimation. A shift is provided to the fine-boundary estimate in the direction of the maximum ACV value to obtain an accurate signal boundary estimate.

However, the above solution fails in systems that have pseudo-multipath problems. Such systems have multiple copies of a signal, each of which has a varying rotation in the time domain for each symbol. As a result, the training fields from one antenna appear as time-shifted versions of the trainings fields from another antenna. Although such a scheme effectively avoids unintentional beam forming, it does not overcome the pseudo-multipath problem, and the pseudo-multipath problem leads to erroneous symbol boundary detection.

FIG. 2A illustrates the data packet 100 of FIGS. 1A and 1B and a time-domain rotated data packet 200. FIG. 2B is a graph illustrating the signal strength (RSSI) of an ideal boundary 202 and a delayed boundary 204. The data packet 100, in addition to elements illustrated in FIGS. 1A and 1B, shows the LTF 104 in detail. The LTF 104 includes a GI2, LP1, and LP2. The samples of the time-domain rotated data packet 200 have been given a cyclic rotation of two (2) samples separately in GI2, LP1, and LP2. As a result, the time-domain rotated data packet 200 appears as a time-shifted version of the data packet 100. Apart from cyclic rotation in the time-domain, the time-domain rotated data packet 200 is identical to the data packet 100. The data packet 100 is provided the time domain cyclic rotation and then relayed from a different antenna to avoid unintentional beam forming. However, the difference in the RSSIs of the carrier signal carrying the data packet 100 and of the carrier signal carrying the time-domain rotated data packet 200, leads to erroneous symbol boundary detection. Thus, instead of detecting the ideal boundary 202 as the symbol boundary, the delayed boundary 204 is detected as the symbol boundary, which causes a synchronization error.

It would be advantageous to be able to accurately and correctly detect a symbol boundary in an OFDM-MIMO system.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION OF THE INVENTION

Figure 1A:
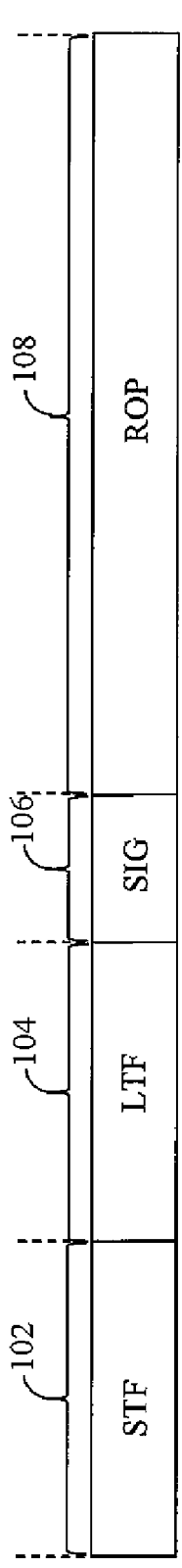
FIGS. 1A and 1B are schematic diagrams illustrating a data packet 100 in accordance with the IEEE 801.11a WLAN standard.
Figure 1B:
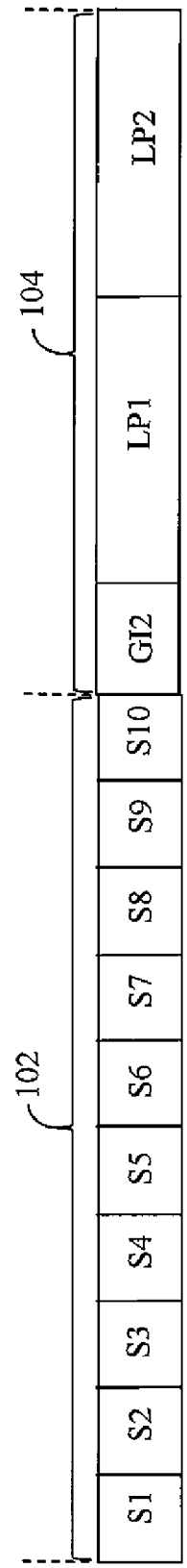
Figure 2A:
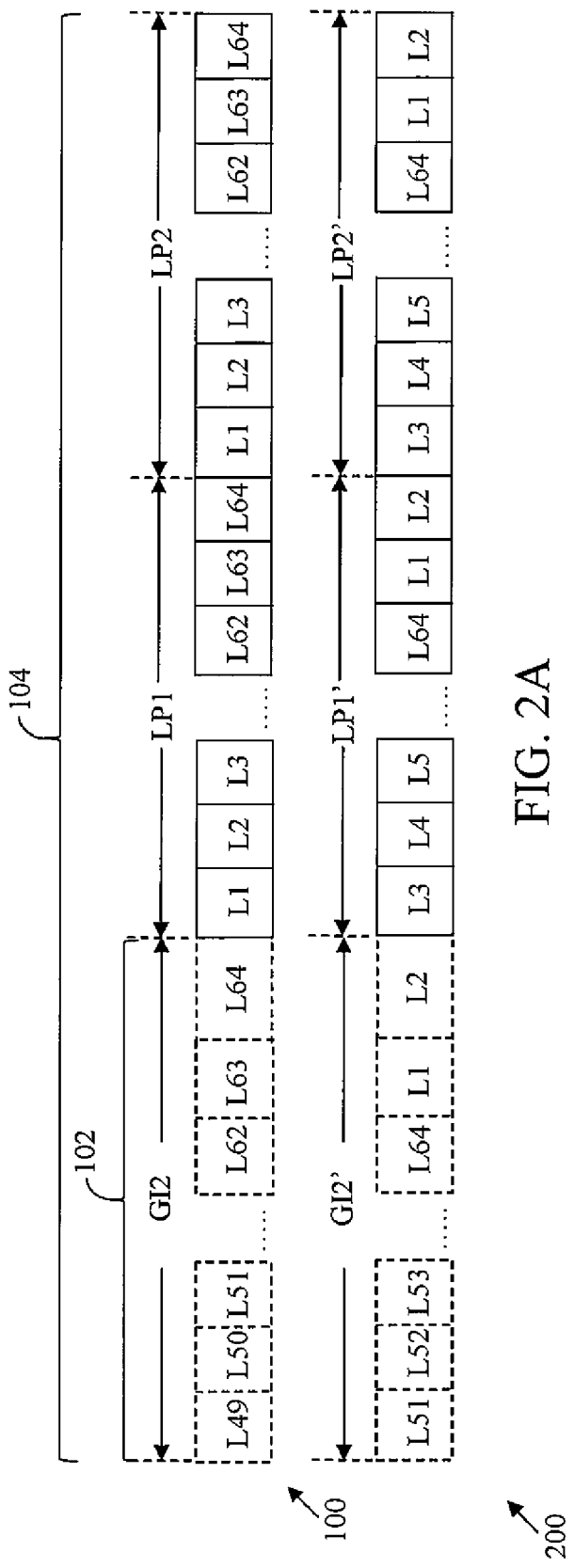
FIG. 2A is a schematic diagram illustrating the data packet 100 of FIG. 1A and a time-domain rotated data packet 200.
Figure 2B:
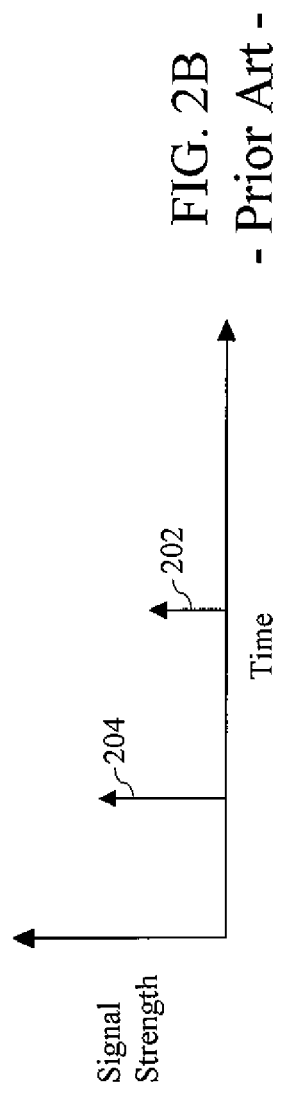
FIG. 2B is a graph illustrating the signal strength of an ideal boundary and a delayed boundary.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a method for determining a symbol boundary in a data packet is provided. The data packet belongs to a received signal and includes a first training field, a guard interval, and a second training field. The received signal is sampled at a predetermined sampling frequency to obtain a plurality of samples of the received signal. Thereafter, a first symbol boundary estimate is determined using one or more block auto-correlation values, in which the first symbol boundary estimate is a coarse estimate of a boundary between the guard interval and the first training field. Additionally, the block auto-correlation values are calculated for the plurality of samples with reference to a previously obtained plurality of samples.

Subsequently, a selection is made of the first set of samples using the first symbol boundary estimate. A second symbol boundary estimate is determined using the first set of samples. The second symbol boundary estimate is an estimate of the boundary between the guard interval and the second training field. Thereafter, a selection is made of a second set of samples in a vicinity of the second symbol boundary estimate and one or more moving average auto-correlation values for the second set of samples are calculated. Each of the one or more moving average auto-correlation values corresponds to a sample belonging to the second set of samples. Subsequently, the second symbol boundary estimate is shifted using the one or more moving average auto-correlation values.

In another embodiment of the present invention, a method for determining a symbol boundary in a data packet is provided. The data packet belongs to a received signal and includes a first training field, a guard interval, and a second training field. The received signal is sampled at a predetermined sampling frequency to obtain a plurality of samples of the received signal. Thereafter, a first symbol boundary estimate is determined using one or more block auto-correlation values, in which the first symbol boundary estimate is an estimate of a boundary between the guard interval and the first training field. Additionally, the block auto-correlation values are calculated for the plurality of samples with reference to a previously obtained plurality of samples.

Subsequently, a selection is made of the first set of samples using the first symbol boundary estimate. A second symbol boundary estimate is determined using the first set of samples. The second symbol boundary is a coarse estimate of the boundary between the guard interval and the second training field.

Further, a first predetermined number of block auto-correlation values for a second set of samples with reference to the previously obtained plurality of samples is determined. The second set of samples is obtained subsequent to the second symbol boundary estimate. Thereafter, the second symbol boundary estimate is shifted using the first predetermined number of block auto-correlation values to obtain a third symbol boundary estimate. A third set of samples are selected that are in a vicinity of the third symbol boundary estimate and one or more moving average auto-correlation values are calculated for the third set of samples. Each of the one or more moving average auto-correlation values corresponds to a sample belonging to the third set of samples. The third symbol boundary estimate is shifted using the one or more moving average auto-correlation values.

In an embodiment of the present invention, a system for determining a symbol boundary in a data packet belonging to a received signal is provided. The system includes a sampling unit for sampling the received signal at a predetermined sampling frequency. The sampling unit generates a plurality of samples of the received signal. A memory is connected to the sampling unit for storing the plurality of samples, the block auto-correlation values, the cross-correlation values, the moving average auto-correlation values, and the stored sample.

The system further includes an auto-correlation unit connected to the sampling unit and the memory. The auto-correlation unit determines one or more block auto-correlation values for the plurality of samples with reference to a previously obtained plurality of samples. A cross-correlation unit is connected to the sampling unit and the memory. The cross-correlation unit determines one or more cross-correlation values for a first set of samples with reference to the one or more stored samples. A moving average auto-correlation unit is connected to the memory, and calculates one or more moving average auto-correlation values for a second set of samples. A processor is connected to the moving average auto-correlation unit, the memory, and the cross-correlation unit. The processor processes at least one of the block auto-correlation values, cross-correlation values, and moving average auto-correlation values to determine at least one symbol boundary estimate.

Various embodiments of the present invention provide a method and a system for determining a symbol boundary in a data packet belonging to a received signal. The data packet includes a first training field, a guard interval, and a second training field. A received signal is sampled to obtain a plurality of samples. A first symbol boundary estimate is determined using one or more block auto-correlation values for the plurality of samples with reference to a previously obtained plurality of samples. Thereafter, a second symbol boundary estimate is determined based on the first symbol boundary estimate and using at least one of one or more cross-correlation values and inverted half auto-correlation values. Thereafter, one or more moving average auto-correlation values are determined for blocks of samples in a vicinity of the second symbol boundary estimate. Thereafter, the second symbol boundary estimate is shifted using the moving average auto-correlation.

The samples in the vicinity of the second symbol boundary are chosen based on value of maximum pseudo-multipath delay. Thereafter, a sample corresponding to a maximum moving average auto-correlation value is determined. A difference between the second symbol boundary estimate and a sample position of maximum moving average auto-correlation value is determined. Thereafter, the second symbol boundary estimate is shifted by a value equal to the difference. The shifted second symbol boundary estimate is closer to an ideal symbol boundary than the second symbol boundary estimate. Thus, the present invention is capable of determining a symbol boundary estimate that is very close to the ideal symbol boundary.

Figure 3:
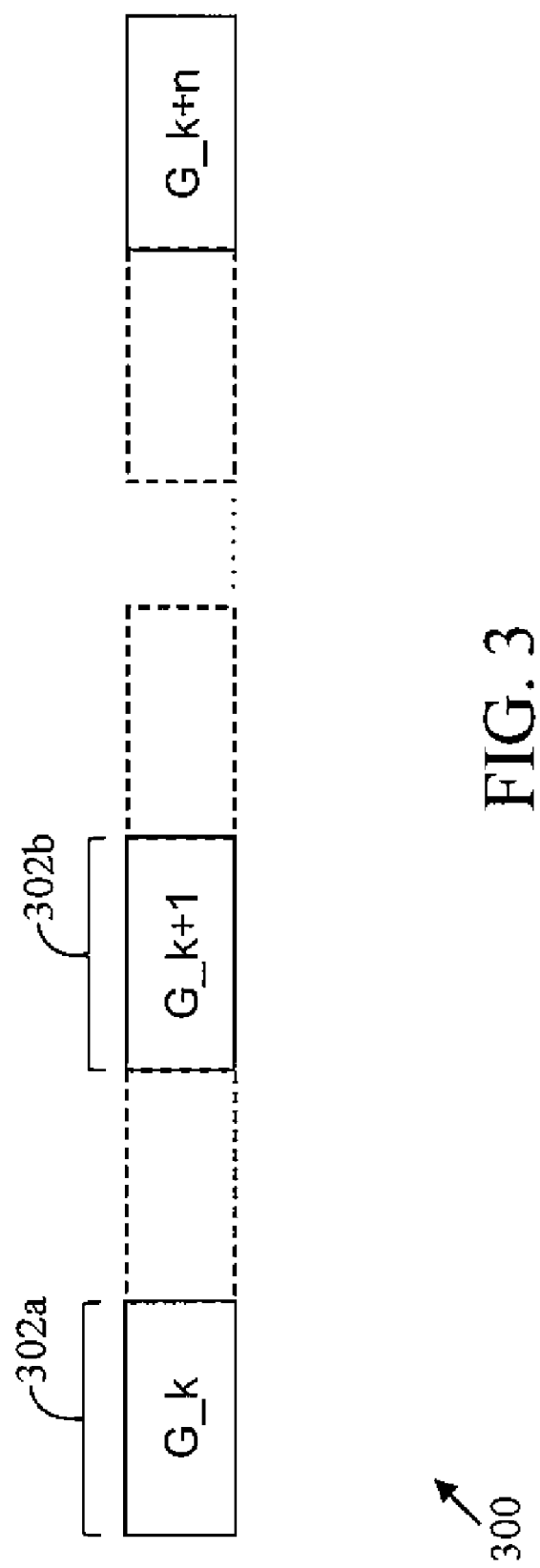
FIG. 3 is a schematic diagram 300 illustrating blocks of samples used for calculating Moving Average Auto-Correlation (MAAc)

Referring now to FIG. 3, a schematic diagram illustrating samples 300 obtained subsequent to sampling of a received signal is shown. The samples 300 include blocks of samples 302a, 302b, etc. Each of the blocks of samples has a sample length equal to GI2, which is 32 samples long and is separated from a subsequent block of samples by 32 samples. In one embodiment of the invention, the MAAc values are calculated using the following expression:

$$MAAc = \frac{1}{n}\sum_{i=1}^{n} G_k \cdot * G_{i+k}$$

where,
$G_k$=block of 32 samples obtained subsequent to sampling of the received signal;
n=number of values for which the MAAc is calculated;
k=1, 2 . . . p; Where p=integer between 32 and 36.

Initially the value of k is chosen to be 1 and each sample belonging to a block of samples corresponding to the value of k ($G_k$) is multiplied with a corresponding sample value of a subsequent block of samples corresponding to i+k, ($G_{i+k}$). The above process is repeated for n blocks of samples, in an example n=2 and subsequently an average is calculated for the values obtained above which is referred to as MAAc. Subsequently, MAAc values are calculated corresponding to k=2, 3 . . . p and are stored.

Figure 4:
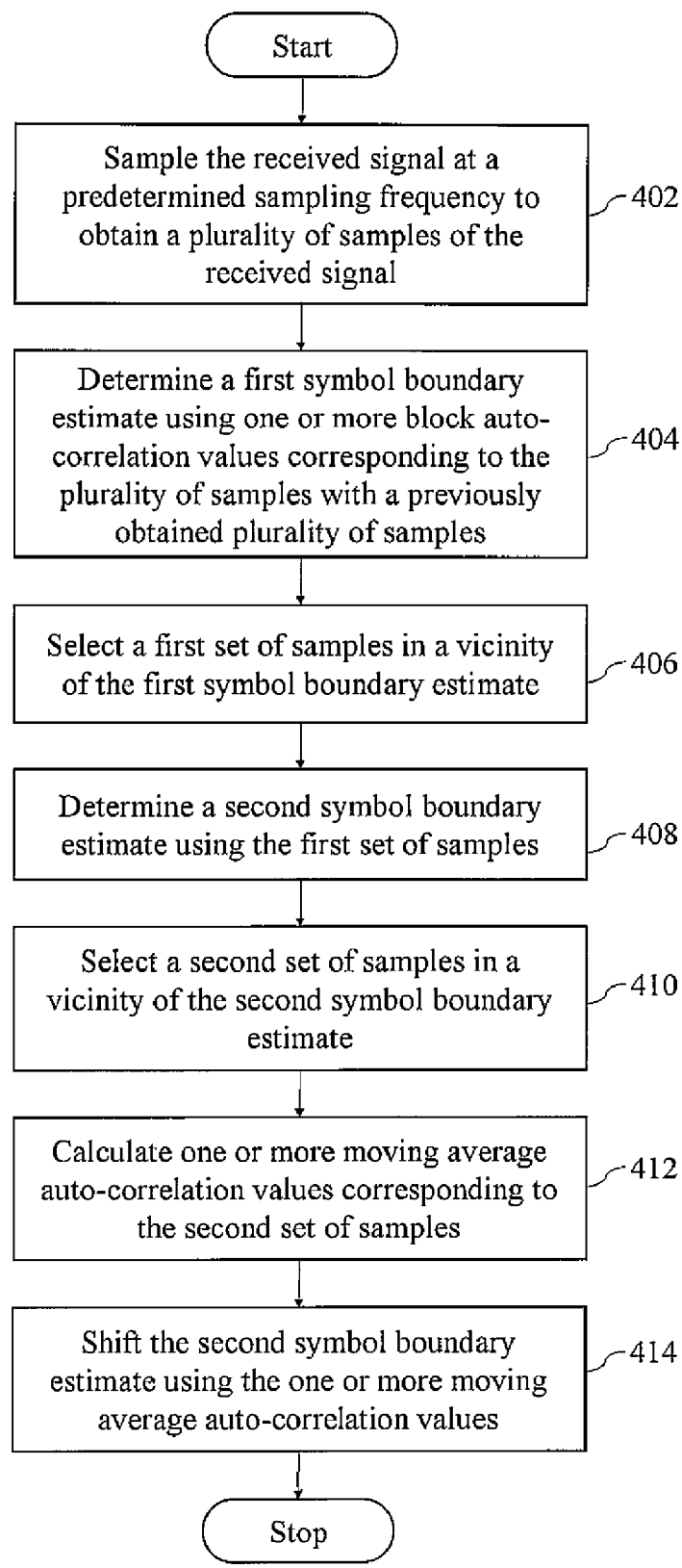
FIG. 4 is a flow chart illustrating a method for determining a symbol boundary in accordance with an embodiment of the present invention.

Referring now to FIG. 4, a flow chart illustrating a method for determining a symbol boundary, in accordance with an embodiment of the present invention is shown. At step 402, a received signal is sampled at a predetermined sampling frequency to obtain a plurality of samples corresponding to the received signal. In an example, the predetermined sampling frequency is 20 MHz. In an embodiment of the present invention, the received signal is a digital signal obtained subsequent to Analog-to-Digital Conversion (ADC) of an analog OFDM signal received by a Radio Frequency (RF) unit. The received signal is sampled subsequent to the corrections for frequency offsets.

At step 404, a first symbol boundary estimate is determined using one or more block auto-correlation values calculated for the plurality of samples with reference to a previously obtained plurality of samples. The previously obtained plurality of samples is obtained a predetermined time duration earlier. The predetermined time duration is equal to an integral multiple of the sample length of a short symbol. In an example, the predetermined time duration is equal to 64 (4×16). The block auto-correlation values are obtained using techniques known in the art. For example, the below expression may be used to obtain the block auto-correlation values (ACVs), $$ACV = \sum_{i=k}^{i=k+N-1} r(i) * r(i+N)'$$

where,
r(k)=received signal at time instant t=k;
r(k)'=complex conjugate of r(k);
N=number of samples for which block auto-correlation values are calculated. In an embodiment of the present invention, a symbol is repeated after every 16 samples. Therefore, the value of N is chosen to be a multiple of 16 such as 64.
n=number of samples between r(k) and r(k)'; in an example n=16.

Thereafter, a set of four block auto-correlation values is calculated for samples located at a separation of samples with reference to the previously obtained plurality of samples. A maximum block auto-correlation value of the set of four block auto-correlation values is determined. The sample corresponding to the maximum block auto-correlation value is chosen as the first symbol boundary estimate. In an embodiment of the present invention, the first symbol boundary estimate is a coarse estimate. At step 406, a first set of samples is selected using the first symbol boundary estimate. The first set of samples is selected such that they are in the vicinity of GI2-LTF boundary. The GI2-LTF boundary is estimated by adding a sample length equal to the guard interval, i.e., 32 samples, to the first symbol boundary estimate.

At step 408 second symbol boundary estimate is obtained using the first set of samples. In two alternative embodiments of the present invention, the second symbol boundary is estimated using the first set of samples in two alternative ways.

In one embodiment of the present invention, one or more cross-correlation values are calculated for the first set of samples with reference to a set of stored samples. It should be realized that the set of stored samples are the actual transmitted samples of long preambles. The one or more cross-correlation values (CCVs) may be calculated using the following mathematical expression:

$$CCV = \sum_{i=k}^{i=k+N-1} s(i-k+1)*r(i+N)'$$

where,
$s(k)$=a $k^{th}$ stored sample;
$r(k)'$=conjugate of a $k^{th}$ received sample;
N=number of samples for which cross-correlation values are obtained.

A CCV is calculated for each sample belonging to the first set of samples. Thus, multiple CCVs are obtained for the first set of samples. Thereafter, a maximum CCV of the above obtained CCVs is determined. The sample corresponding to the maximum CCV is selected as the second symbol boundary estimate. The second symbol boundary estimate is a fine estimate of the GI2-LTF boundary.

In another embodiment of the present invention, one or more inverted half auto-correlation (InvCVs) values are calculated for the first set of samples with reference to the plurality of previously received samples.

$$InvCV = \sum_{i=k}^{i=k+\frac{N}{2}-1} r(i)*r(N-i+1)'$$

wherein, the various variables have meanings similar to the variables of expressions explained above.

Thereafter, a maximum InvCV of the one or more InvCVs obtained above is determined. A sample corresponding to the maximum InvCV determined is selected as the second symbol boundary estimate.

At step 410, a second set of samples is selected in the vicinity of the second symbol boundary estimate. The second set of samples includes a first predetermined number of samples received prior to the second symbol boundary estimate and a second predetermined number of samples received subsequent to the second symbol boundary estimate. In an embodiment of the present invention, the first predetermined number is equal to $D_{PM}+K$, in which $D_{PM}$ is a number of samples corresponding to maximum pseudo-multipath delay and K is obtained through practical implementations. Further, the second predetermined number of samples is equal to $D_{PM}+K+m$, in which $D_{PM}$ is a number of samples corresponding to the maximum pseudo-multipath delay and m is obtained through practical implementations. In an example $D_{PM}$ may have a value=10, K may lie in the range of 32-36, and m may be in the range of 160-170.

At step 412, one or more moving average auto-correlation (MAAc) values are calculated for the second set of samples selected. The second set of samples is divided into blocks of samples, such that each block of samples includes 32 samples and is at a separation of 32 samples from the subsequent block of samples. Thereafter, the MAAc values corresponding to the blocks of samples are calculated following the method explained in conjunction with FIG. 3.

At step 414, the second symbol boundary estimate is shifted using the one or more MAAc values. A maximum MAAc value of the MAAc values is obtained. A difference between the second symbol boundary estimate and the sample position corresponding to the maximum MAAc value is calculated. Thereafter, the second symbol boundary estimate is provided a shift equal to the difference between the second symbol boundary estimate and the sample position corresponding to the maximum MAAc value such that the second symbol boundary estimate is shifted towards a more recently received sample with reference to the second symbol boundary estimate.

Figure 5A:
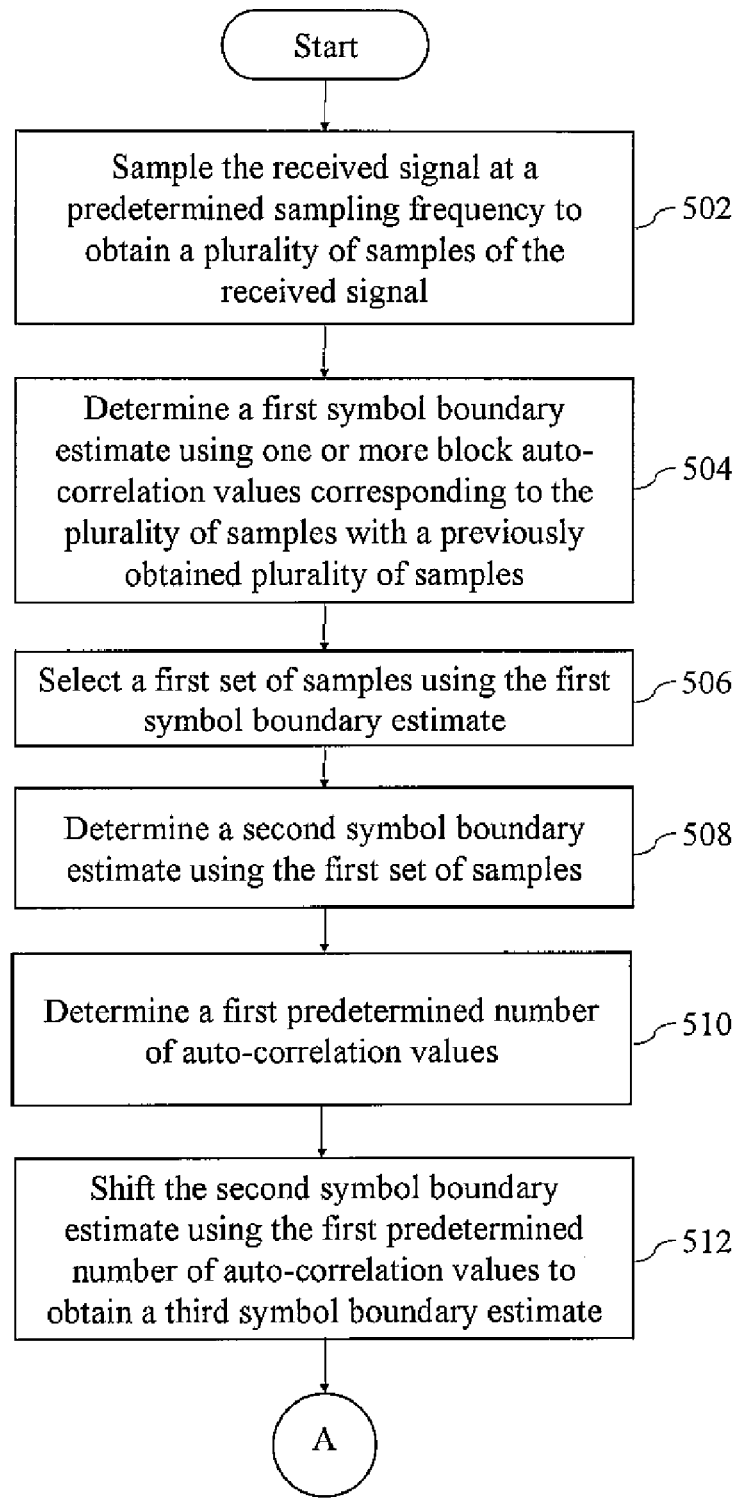
FIGS. 5A and 5B are flow charts illustrating a method for determining a symbol boundary in accordance with another embodiment of the present invention.
Figure 5B:
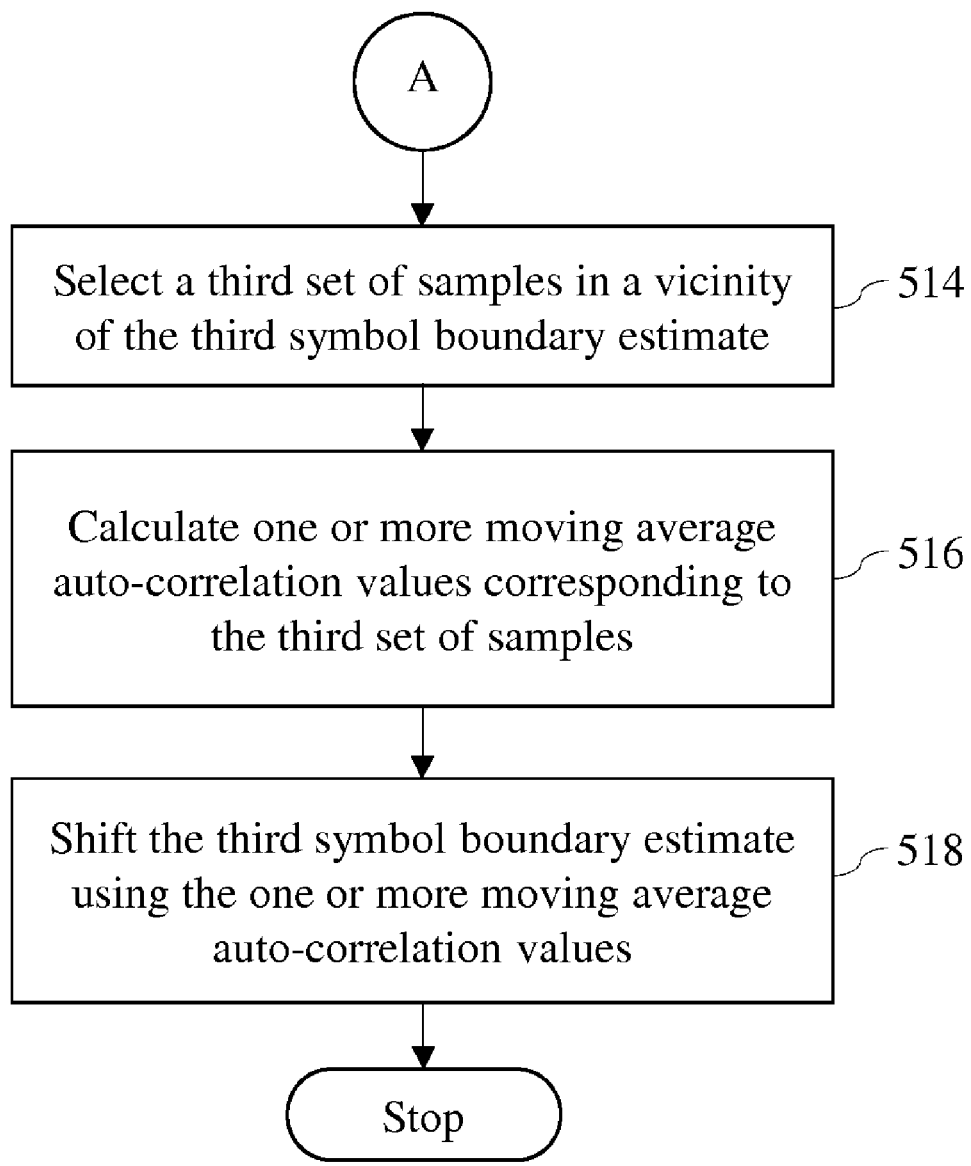

Referring now to FIGS. 5A and 5B, a flow chart illustrating a method for determining symbol boundary in accordance with another embodiment of the present invention is shown. At step 502, a received signal is sampled at a predetermined sampling frequency to obtain a plurality of samples corresponding to the received signal. Step 502 is similar to step 402, which was explained in detail in conjunction with FIG. 4.

At step 504, a first symbol boundary estimate is determined using one or more ACVs for the plurality of samples with reference to a previously obtained plurality of samples. Step 504 is similar to step 404, which was explained in detail in conjunction with FIG. 4.

At step 506, a first set of samples is selected using the first symbol boundary estimate. Step 506 is similar to step 406 which is explained in detail in conjunction with FIG. 4. At step 508, a second symbol boundary estimate is obtained using the first set of samples. Step 508 is similar to step 408, which was explained in detail in conjunction with FIG. 4.

At step 510, a first predetermined number of ACVs is obtained for a second set of samples obtained subsequent to the second symbol boundary estimate with reference to the previously obtained plurality of samples. In an embodiment of the present invention, the first predetermined number is three and each ACV is calculated for N=64 samples corresponding to samples separated by n=32 samples. A detailed expression for obtaining ACVs has been explained in conjunction with FIG. 4. At step 512, the second symbol boundary estimate is shifted using the first predetermined number of ACVs to obtain a third symbol boundary estimate. The method followed for shifting the second symbol boundary estimate is explained below in conjunction with Table A.

TABLE A

|  | Condition | | |
| --- | --- | --- | --- |
|  | C1 | C2 | C3 |
| ACVs | 54 55 49 | 54 48 47 | 45 46 47 |
| Shift in the second estimate | +32 samples | No shift | −32 samples |

Referring to Table A, in condition C1 three ACVs are obtained 54, 55, and 49. Assuming the maximum block auto-correlation value obtained during the first symbol boundary estimation to be equal to 53, then the first and second block auto-correlation values obtained are close to the maximum block auto-correlation value (53). Thus, a right shift of 32 samples is provided to the second symbol boundary estimate to shift closer to the GI2-LTF boundary. Thus, a third symbol boundary estimate is obtained. Similarly, assuming the maximum block auto-correlation value to be equal to 53, the shifts provided to the second symbol boundary estimate in remaining conditions C2 and C3 may be explained.

At step 514, a third set of samples is selected in the vicinity of the third symbol boundary estimate. Step 514 is similar to step 410 which is explained in conjunction with FIG. 4. At step 516, one or more moving average auto-correlation (MAAc) values are calculated for the third set of samples selected. Step 516 is similar to step 412 which is explained in conjunction with FIG. 4. At step 518, the third symbol boundary estimate is shifted using the one or more MAAc values. A maximum MAAc value of the one or more MAAc values is obtained. A difference between the third symbol boundary estimate and the sample position corresponding to the maximum MAAc value is calculated. Thereafter, the third symbol boundary estimate is provided a shift equal to the difference between the third symbol boundary estimate and the sample position corresponding to the maximum MAAc value. The third symbol boundary estimate is shifted such that the third symbol boundary estimate is shifted towards a more recently received sample with reference to the third symbol boundary estimate.

Figure 6:
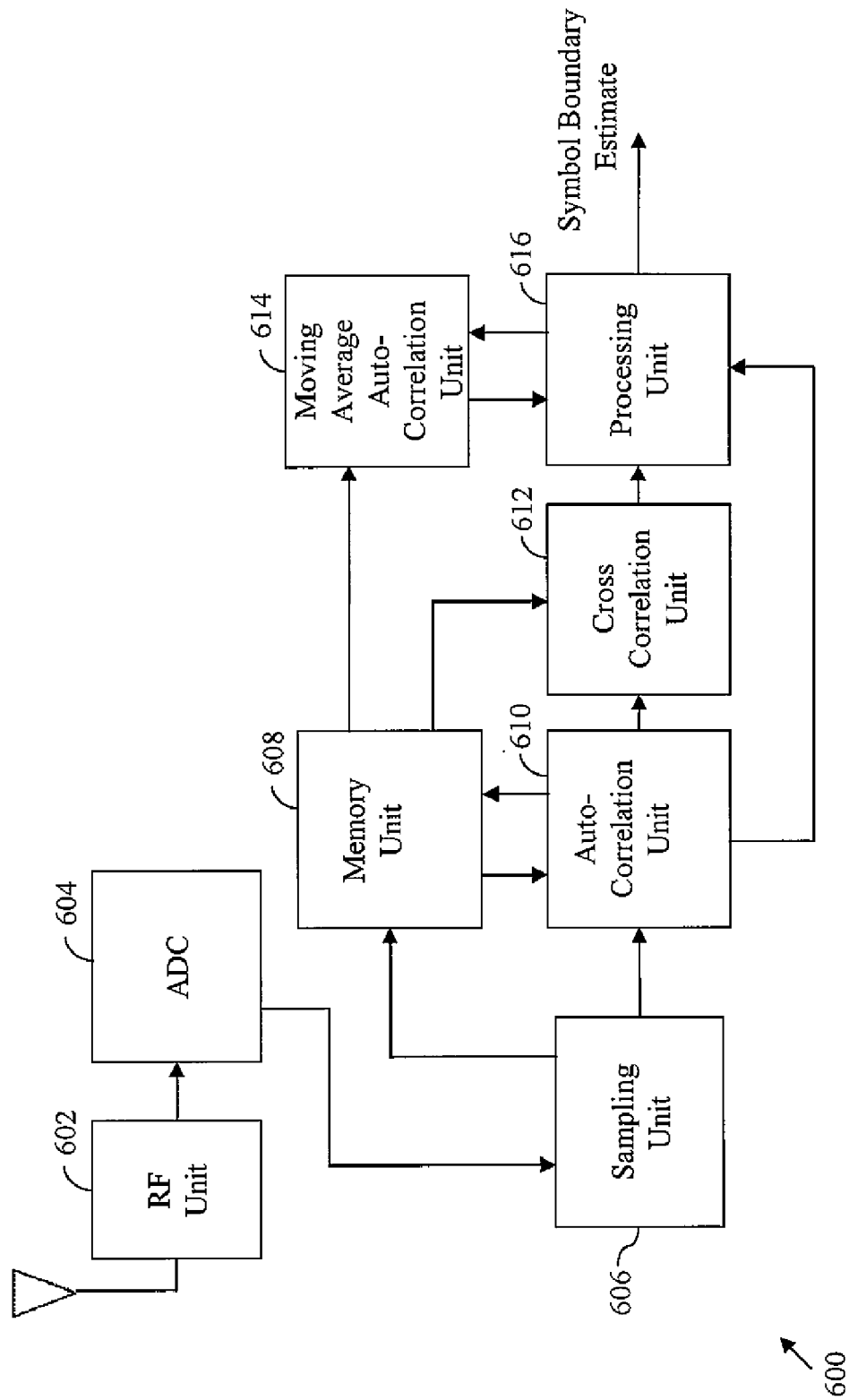
FIG. 6 is a schematic block diagram of a system for symbol boundary detection in accordance with an embodiment of the present invention.

Referring now to FIG. 6, a receiver system 600 for determining symbol boundary, in accordance with an embodiment of the present invention, is shown. The receiver system 600 includes an RF unit 602, an ADC 604, a sampling unit 606, a memory 608, an auto-correlation unit 610, a cross-correlation unit 612, a MAAc unit 614, and a processor 616.

The RF unit 602 receives a radio signal and provides an analog OFDM signal. The analog OFDM signal is received and transmitted at a maximum transmission rate of 54 Mbps on multiple sub-channels in a 5.4 GHz frequency band as defined in IEEE 802.11n for WLAN standard. The ADC 604 samples and converts the analog OFDM signal into a digital signal and provides it to the sampling unit 606. The sampling unit 606 samples the digital signal to obtain a plurality of samples. Thereafter, the sampling unit 606 provides the samples to the auto-correlation unit 610 and also to the memory 608. In an embodiment of the present invention, the memory 608 is a set of registers used to store the samples, the ACVs, the CCVs, the InvCVs, the MAAcVs, and the set of samples based on previous symbol boundary detection. The auto-correlation unit 610 calculates ACVs for the plurality of samples with reference to a previously obtained plurality of samples. The auto-correlation unit 610 accesses the previously obtained plurality of samples from the memory 608. The auto-correlation unit 610 provides the calculated ACVs to the memory 608 and to the processor 616. The processor 616 processes the ACVs and determines a first symbol boundary estimate. The first symbol boundary estimate is an estimate of the boundary between the STF and the GI2. The method for determining the first symbol boundary has been explained in detail in conjunction with FIG. 4.

Thereafter, the processor 616 selects a first set of samples using the first symbol boundary estimate. The first set of samples are such that they are in the vicinity of the GI2-LTF boundary estimate and provides the first set of samples to the cross-correlation unit 612. The cross-correlation unit 612 calculates CCVs for the first set of samples and provides the CCVs to the processor 616.

Subsequently, the processor 616 processes the CCVs and selects the sample corresponding to the maximum CCV as the second symbol boundary estimate.

In an alternative embodiment of the present invention, the processor 616 provides the first set of samples to an inverted half auto-correlation unit (not shown). The inverted half auto-correlation unit calculates InvCVs for the first set of samples with reference to the previously obtained plurality of samples. Thereafter, the inverted half auto-correlation unit provides the InvCVs to the processor 616. Subsequently, the processor 616 processes the InvCVs and selects the sample corresponding to the maximum InvCV as the second symbol boundary estimate.

Thereafter, the processor 616 directs the auto-correlation unit 610 to determine ACVs of a second set of samples obtained subsequent to the second symbol boundary estimate with the previously obtained plurality of samples. The processor 616 then shifts the second symbol boundary estimate based on the ACVs above obtained. This provides a third symbol boundary estimate. The method followed for obtaining the third symbol boundary estimate using the ACVs is explained in detail in conjunction with FIGS. 5A and 5B and Table A. Subsequently, the processor 616 selects a third set of samples in a vicinity of the third boundary estimate. The third set of samples includes a second predetermined number of samples received prior to the third symbol boundary estimate and a third predetermined number of samples received subsequent to the third symbol boundary estimate. In an embodiment of the present invention, the second predetermined number is equal to $D_{PM}+K$, in which $D_{PM}$ is a number of samples corresponding to maximum pseudo-multipath delay and K is obtained through practical implementations. Further, the third predetermined number of samples is equal to $D_{PM}+K+m$, in which $D_{PM}$ is a number of samples corresponding to maximum pseudo-multipath delay and m is obtained through practical implementations. In an example $D_{PM}$ may have a value=10, K may lie in the range of 32-36, and m may be in the range of 160-170.

Thereafter, the third set of samples is provided to the MAAc unit 614 that calculates MAAc values for the third set of samples. Each MAAc value corresponds to a sample of the third set of samples. The mathematical expression used to calculate the MAAc values was explained above with reference to FIG. 3. The processor 616 then selects a sample corresponding to a maximum MAAc value. Thereafter, the third symbol boundary estimate is shifted by a value equal to a difference between the third symbol boundary estimate and the sample corresponding to the maximum MAAc value. The shift provided to the third symbol boundary is such that the second symbol boundary estimate is shifted towards a more recently received sample with reference to the third symbol boundary estimate. Thus, the third symbol boundary estimate is shifted closer to the ideal symbol boundary.

In an alternative embodiment of the present invention, the processor 616 directs the MAAc unit 614 to calculate MAAc values for each sample of a second set of samples. The second set of samples is selected by the processor 616 in a vicinity of the second symbol boundary estimate. The second set of samples includes samples selected in a manner similar to the manner of selection of samples for the third set of samples in the embodiment described above. The processor 616 then selects a sample corresponding to a maximum MAAc value. Thereafter, the second symbol boundary estimate is shifted by a value equal to a difference between the second symbol boundary estimate and the sample corresponding to the maximum MAAc value. The shift provided to the second symbol boundary is such that the second symbol boundary estimate is shifted towards a more recently received sample with reference to the second symbol boundary estimate. Thus, the second symbol boundary estimate is shifted closer to the ideal symbol boundary.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

What is claimed is:

1. A method for determining a symbol boundary in a data packet belonging to a received signal, the data packet comprising a first training field, a guard interval, and a second training field, the method comprising:
sampling the received signal at a predetermined sampling frequency to obtain a plurality of samples of the received signal;
determining a first symbol boundary estimate using one or more block auto-correlation values for the plurality of samples with reference to a previously obtained plurality of samples, wherein the first symbol boundary estimate is an estimate of a boundary between the first training field and the guard interval;
selecting a first set of samples using the first symbol boundary estimate;
determining a second symbol boundary estimate using the first set of samples, wherein the second symbol boundary estimate is an estimate of a boundary between the guard interval and the second training field;
selecting a second set of samples in a vicinity of the second symbol boundary estimate;
calculating one or more moving average auto-correlation values for the second set of samples, wherein each of the one or more moving average auto-correlation values corresponds to a sample belonging to the second set of samples; and
shifting the second symbol boundary estimate using the one or more moving average auto-correlation values.

2. The method for determining a symbol boundary in the data packet of claim 1, wherein the first symbol boundary estimate is estimated based on a maximum block auto-correlation value of the one or more block auto-correlation values.

3. The method for determining a symbol boundary in the data packet of claim 1, wherein the determination of the second symbol boundary estimate comprises determining one or more inverted half auto-correlation values for the first set of samples based on the previously obtained plurality of samples.

4. The method for determining a symbol boundary in the data packet of claim 3, wherein the second symbol boundary estimate is estimated based on a maximum inverted half auto-correlation value of the one or more inverted half auto-correlation values.

5. The method for determining a symbol boundary in the data packet of claim 1, wherein the determination of the second symbol boundary estimate comprises determining one or more cross-correlation values for the first set of samples with reference to a set of stored samples.

6. The method for determining a symbol boundary in the data packet of claim 5, wherein the second symbol boundary estimate is selected based on a maximum cross-correlation value of the one or more cross-correlation values.

7. The method for determining a symbol boundary in the data packet of claim 1, wherein the second set of samples comprises a first predetermined number of samples received prior to the second symbol boundary estimate and a second predetermined number of samples received subsequent to the second symbol boundary estimate.

8. A method for determining a symbol boundary in a data packet belonging to a received signal, the data packet comprising a first training field, a guard interval, and a second training field, the method comprising:
sampling the received signal at a predetermined sampling frequency to obtain a plurality of samples of the received signal;
determining a first symbol boundary estimate using one or more block auto-correlation values for the plurality of samples based on a previously obtained plurality of samples, wherein the first symbol boundary estimate is an estimate of a boundary between the first training field and the guard interval;
selecting a first set of samples using the first symbol boundary estimate;
determining a second symbol boundary estimate using the first set of samples, wherein the second symbol boundary estimate is an estimate of a boundary between the guard interval and the second training field;
determining a first predetermined number of the one or more block auto-correlation values for a second set of samples obtained subsequent to the second symbol boundary estimate with reference to the previously obtained plurality of samples;
shifting the second symbol boundary estimate using the first predetermined number of the one or more block auto-correlation values to obtain a third symbol boundary estimate;
selecting a third set of samples in a vicinity of the third boundary estimate;
calculating one or more moving average auto-correlation values for the third set of samples, wherein each of the one or more moving average auto-correlation values corresponds to a sample belonging to the third set of samples; and
shifting the third symbol boundary estimate using the one or more moving average auto-correlation values.

9. The method for determining a symbol boundary in the data packet of claim 8, wherein the first symbol boundary estimate is estimated based on a maximum block auto-correlation value of the one or more block auto-correlation values.

10. The method for determining a symbol boundary in the data packet of claim 8, wherein the determination of the second symbol boundary estimate comprises, determining one or more inverted half auto-correlation values for the first set of samples based on the previously obtained plurality of samples.

11. The method for determining a symbol boundary in the data packet of claim 10, wherein the second symbol boundary estimate is estimated based on a maximum inverted half auto-correlation value of the one or more inverted half auto-correlation values.

12. The method for determining a symbol boundary in the data packet of claim 8, wherein the determination of the second symbol boundary estimate comprises, determining one or more cross-correlation values for the first set of samples based on a set of stored samples.

13. The method for determining a symbol boundary in the data packet of claim 12, wherein the second symbol boundary estimate is selected based on a maximum cross-correlation value of the one or more cross-correlation values.

14. The method for determining a symbol boundary in the data packet of claim 8, wherein the second symbol boundary estimate is shifted based on comparison of the first predetermined number of the one or more block auto-correlation values with a maximum block auto-correlation value.

15. The method for determining a symbol boundary in the data packet of claim 8, wherein the third set of samples comprises a first predetermined number of samples received prior to the third symbol boundary estimate and a second predetermined number of samples received subsequent to the third symbol boundary estimate.

16. A system for determining a symbol boundary in a data packet belonging to a received signal, the data packet comprising a first training field, a guard interval, and a second training field, the system comprising:
a sampling unit for sampling the received signal at a predetermined sampling frequency to obtain a plurality of samples of the received signal;
a memory, connected to the sampling unit, for storing at least one of the plurality of samples, one or more block auto-correlation values, one or more cross-correlation values, and one or more moving average auto-correlation values;
an auto-correlation unit, connected to the sampling unit and the memory, for determining the one or more block auto-correlation values for the plurality of samples based on a previously obtained plurality of samples;
a cross-correlation unit, connected to the sampling unit and the memory, for determining the one or more cross-correlation values for a first set of samples based on one or more of the stored plurality of samples;
a moving average auto-correlation unit, connected to the memory, for calculating the one or more moving average auto-correlation values for a second set of samples, wherein each of the one or more moving average auto-correlation values corresponds to a sample belonging to the second set of samples; and
a processor, connected to the moving average auto-correlation unit, the memory, and the cross-correlation unit, for processing at least one of the one or more block auto-correlation values, the cross-correlation values, and the moving average auto-correlation values to determine at least one symbol boundary estimate.

17. The system for determining a symbol boundary in the data packet of claim 16, wherein the at least one symbol boundary estimate is one of an estimate of a boundary between the first training field and the guard interval, and a boundary between the guard interval and the second training field.

18. The system for determining a symbol boundary in the data packet of claim 16, further comprising a radio-frequency unit, coupled to the sampling unit, for receiving an Orthogonal Frequency Division Multiplexing (OFDM) radio signal and providing the OFDM radio signal to the sampling unit.

19. The system for determining a symbol boundary in the data packet of claim 16, wherein the system is part of an IEEE 802.11n Wireless Local Area Network (WLAN) communication system.

* * * * *